Figure 1:
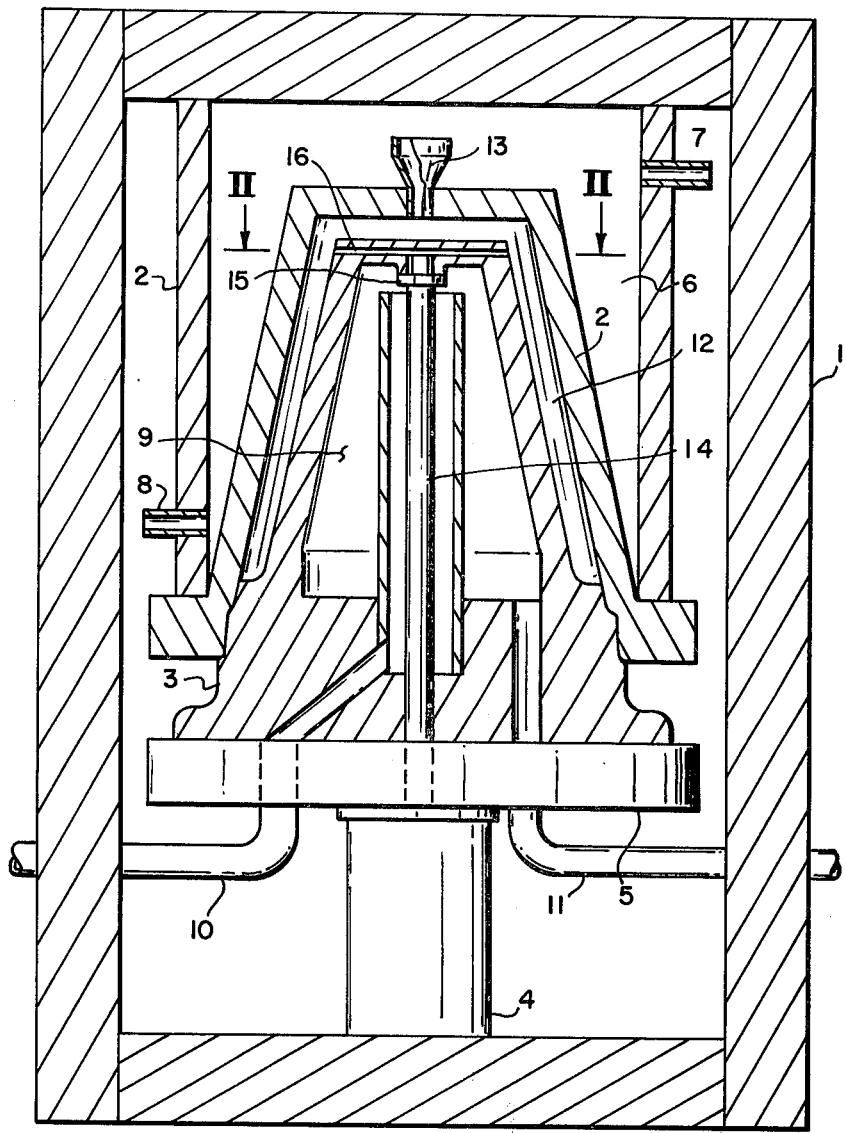

United States Patent [19]

Frank

[11] 3,946,981

[45] Mar. 30, 1976

[54] MOLDING APPARATUS

[76] Inventor: Alan I. W. Frank, c/o Alan I. W. Frank Corporation, Exton, Pa. 19341

[22] Filed: Mar. 4, 1975

[21] Appl. No.: 555,233

Related U.S. Application Data

[63] Continuation of Ser. No. 433,189, Jan. 14, 1974, abandoned, which is a continuation-in-part of Ser. No. 308,194, Nov. 10, 1972, abandoned.

[52] U.S. Cl. ............... 249/79; 264/41; 425/414; 425/427; 425/817 R
[51] Int. Cl.²... B22D 27/02; B28B 1/50; B29C 3/00
[58] Field of Search............ 425/4 R, 817, 243, 249, 425/420, 812, 420; 264/51, 41, 53; 251/DIG. 1; 249/79

[56] References Cited
UNITED STATES PATENTS

| | | | |
|---|---|---|---|
| 1,826,945 | 10/1931 | McKay et al. | 425/420 |
| 2,007,567 | 9/1935 | Fischer | 425/420 X |
| 3,013,304 | 12/1961 | Richie | 425/817 X |
| 3,079,630 | 3/1963 | Orr | 264/51 |
| 3,125,780 | 3/1964 | Harrison | 425/243 |
| 3,170,010 | 2/1965 | Schultz | 425/817 X |
| 3,261,055 | 7/1966 | Dart | 425/817 X |
| 3,351,978 | 11/1967 | Kraus | 264/53 X |
| 3,417,173 | 12/1968 | Harrison | 425/243 |
| 3,505,435 | 4/1970 | Schmidt | 264/51 X |
| 3,825,378 | 7/1974 | Dart | 264/51 X |

*Primary Examiner*—Francis S. Husar
*Assistant Examiner*—John S. Brown

[57] ABSTRACT

Molding apparatus for forming an article out of heat-softenable polymeric material, the molding apparatus comprising a mold including a mold cavity and a core insertable into said cavity to define a molding space of the configuration desired in a molded product for receiving the heat-softenable polymeric material, the core being made of heat-conducting material, means, normally including a steam chest in thermo-conductive relationship to the mold, for heating the mold, means for admitting into the molding space heat-softenable polymeric material for forming the article and means for conducting steam from the steam chest into the mold cavity to aid in forming expanding and the heat-softenable polymeric material into an article having the shape of the molding space, the last mentioned means comprising at least one duct having a cross-sectional area not greater than 0.001 squre inch, preferably 0.0006 square inch or less, extending radially through the heat-conducting material of the core in which moisture in the steam being conducted into the mold cavity is vaporized. For optimum results a plurality of such ducts each having a cross-sectional area not greater than 0.001 square inch are provided which radiate from the mold axis. The means for heating the core may comprise means for conducting steam into contact with the mold, and some of the steam used to heat the mold may be conducted into the molding space to aid in forming the heat-softenable polymeric material into an article having the shape of the molding space. When forming a cup-shaped article the mold has a cup-shaped mold cavity for receiving the heat-softenable polymeric material and the core is comprised of heat conducting material in particular at the portion thereof where the bottom of the cup-shaped article is formed where the temperature is maximum, and in such case the means for conducting steam into the mold cavity may include valve means at the portion of the mold where the bottom of the cup-shaped article is formed and duct means as above defined extending through the heat conducting material of the core at the portion of the mold where the bottom of the cup-shaped article is formed.

3 Claims, 2 Drawing Figures

U.S. Patent    March 30, 1976    3,946,981

MOLDING APPARATUS

This is a continuation of application Ser. No. 433,189, filed Jan. 14, 1974, which in turn was a continuation-in-part of application Ser. No. 308,194, filed Nov. 10, 1972, both of which applications are now abandoned.

This invention relates to the molding of articles out of heat-softenable polymeric material and particularly thinwalled articles such as drinking cups and similar cup-shaped articles. An example of heat-softenable polymeric material which may be molded in my molding apparatus is expandable polystyrene which may be in the form of beads or spheres. An object of my invention is to vaporize moisture in the steam which is conducted directly into the molding space to aid in forming the heat-softenable polymeric material into an article having the shape defined between the mold parts. Thin-walled articles such as drinking cups are especially vulnerable to the adverse effects of moisture during the molding process. Excessive moisture increases the cycle time, increases steam consumption and causes defective product in that the moisture interferes with the fusion of the heat softened expanded beads or particles into an integral whole during the molding process.

Prior practice involved the employment of a mold design and procedure in which the mold was heated by passing steam through the steam chest of the mold. Simultaneously with the heating of the mold, condensate was flushed from the steam chest. This was followed by steam injection into the molding space through a small valved opening in the wall of the core between the steam chest and the molding space. The valve was usually located directly on the core wall and interface with the heat-softenable polymeric material in the molding space. This had the disadvantage that any moisture in the system tended to be carried over into the molding space defined between the core and cavity parts. Such moisture might be in the form of steam condensate from the steam service lines or droplets of water leaking by the valve in the core wall.

I provide molding apparatus which directs the steam and moisture after passing through the valve into duct means of predetermined small cross-sectional area extending through the heat conducting material of the core whereby the heat content of such heat conducting material vaporizes moisture in the steam prior to its entering the molding space. Such duct means must have a cross-sectional area not greater than 0.001 square inch, a cross-sectional area of 0.0006 square inch or less being preferred for optimum results.

I provide molding apparatus for forming an article out of heat-softenable polymeric material, the molding apparatus comprising a mold including a mold cavity and a core defining a molding space therebetween for receiving the heat-softenable polymeric material, the core being made of heat-conducting material, means for heating the mold, means for admitting into the molding space heat-softenable polymeric material for forming the article and means for conducting steam into the molding space to aid in forming the heat-softenable polymeric material into an article having the shape defined between the core and cavity, the last mentioned means including duct means of predetermined small cross-sectional area as above defined extending through the heat-conducting material of the core in which moisture in the steam being conducted into the molding space is vaporized. For optimum results I provide a plurality of ducts radiating from the mold axis. The means for heating the core may comprise means for conducting steam into contact with the core, and some of the steam used to heat the core may be conducted into the molding space to aid in forming the heat-softenable polymeric material into an article having the shape of this space. When forming a cup-shaped article the mold has a cup-shaped molding space for receiving the heat-softenable polymeric material and the core is comprised of heat-conducting material at the portion thereof where the bottom of the cup-shaped article is formed where the temperature is maximum, and in such case the means for conducting steam into the molding space may include duct means as above defined extending through the heat conducting material of the core at the portion of the mold where the bottom of the cup-shaped article is formed. Each duct, whether one or a plurality of ducts is provided, has a cross-sectional area not greater than 0.001 square inch, preferably 0.0006 square inch or less. Adequate vaporization is not accomplished by duct means of greater cross-sectional area.

Other details, objects and advantages of the invention will become apparent as the following description of a present preferred embodiment thereof proceeds.

Figure 2:
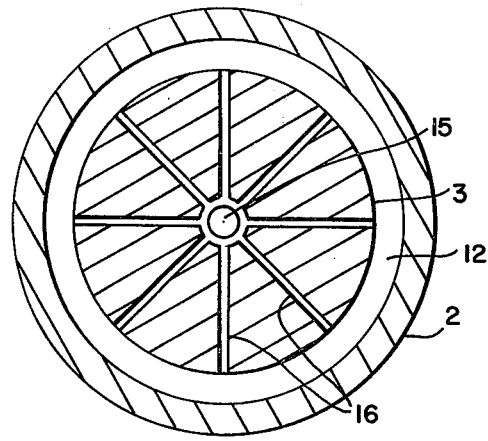

In the accompanying drawings I have shown a present preferred embodiment of the invention in which FIG. 1 is a diagrammatic vertical cross-sectional view of my molding apparatus and FIG. 2 is a horizontal cross-sectional view taken on the line II—II of FIG. 1.

Referring now more particularly to the drawings, a support frame 1 is provided for mounting the upper mold member 2, and the lower core member 3 is mounted for vertical movement upon a piston in a cylinder 4 through a platen 5. Water and steam pass alternately through the upper steam chest 6, entering at 7 and leaving at 8. The steam chest 9 in the lower core member 3 is alternatly cycled with steam and water through inlet 10 and outlet 11.

Heat-softenable polymeric material is introduced into the molding space 12 between the members 2 and 3 through a suitable inlet 13 by means of an air injection system as well known to those skilled in the art. At the appropriate time in the cycle, also as well known to those skilled in the art, steam is conducted into the molding space 12. This is accomplished by withdrawing downward the steam injection actuator member 14 by a suitable device (not shown) beneath the platen 5. This opens the valve 15 allowing steam to pass from the steam chest 9 into duct means 16 in the top of the core, as shown, said duct means having a cross-sectional area not greater than .001 square inch located in the top wall of the lower core member 3. As shown in FIG. 2, the duct means are in the form of ducts which radiate from the mold axis.

As the valve member 15 opens some of the steam used to heat the mold passes through the ducts 16 into the molding space 12. As above stated the ducts 16 are at the hottest part of the core. Moisture in the steam passing through the ducts 16 of very small cross-sectional area absorbs heat from the core which may be at a temperature of 250° F. or higher during this portion of the cycle, and moisture is vaporized. An increase in the contact area of the stem with the core material increases the drying effect on the steam; to this end the duct means are formed as ducts of very small cross-sectional area as above defined and a considerable number of such ducts, shown as eight in FIG. 2, are preferably provided. While maximum vaporization is obtained by positioning the ducts 16 as shown and above described, vaporization benefits are also obtained when the duct means are located down the side walls of the mold member 3 to a distance of from    to 2 from the top, depending on the size and shape of the mold. The limiting factor as to the position of the ducts is the large metal "heat sink" represented by the platen 5 and the lower portion of the bottom core member which tends to reduce the temperature at the lower portion thereof with an accompanying loss of the heat of vaporization available to dry the steam being introduced into the molding space. Heat loss as the result of conduction to the "heat sink" from points along the side wall of the core member 3 within 1 inch of the lowest point of the core wall are in such magnitude that that area offers relatively little heat if any transfer for moisture vaporization.

While I have shown and described a present preferred embodiment of the invention it is to be distinctly understood that the invention is not limited thereto but may be otherwise variously embodied within the scope of the following claims.

I claim:

1. Molding apparatus for forming a thin walled article such as a cup or similar vessel from heat softenable, expandable, polymeric particular material, said apparatus including mold parts comprised of a mold cavity and a complementary shaped mold core, which together form an article defining molding space therebetween for receiving the heat softenable particulate material and expanding and uniting said particulate material into a final product in an inverted position, said parts being formed of heat conducting material; means for heating said mold parts, said means for heating including steam chambers within said mold parts for receiving steam therein and means for admitting only dry steam into the molding space adjacent that portion of the molding space where the bottom of the article is formed, said means including a valve housed within and positioned at the top of said core, a valve actuator member operable to open and close said valve and duct means located only along the top of said core, said duct means extending radially and outwardly through the heat conducting material of the core along the top thereof from said valve to the molding space, said duct means comprising a plurality of ducts each having a cross sectional area of not more than 0.001 square inches, said valve means, when open, placing said duct means in communication with the steam chamber in said core whereby, as said steam is passing through said duct means, moisture entrained therein is vaporized during passage through said duct and said steam enters the molding space as dry steam.

2. Molding apparatus as defined in claim 1 wherein each duct has a cross sectional area of 0.0006 suare inches.

3. Molding apparatus as defined in claim 1 wherein said valve means includes an operable means operable to open said valve at a pre-determined period during the admission of steam into the steam chambers.

* * * * *

UNITED STATES PATENT OFFICE
CERTIFICATE OF CORRECTION

Patent No. 3,946,981     Dated March 30, 1976

Inventor(s) ALAN I W FRANK

It is certified that error appears in the above-identified patent and that said Letters Patent are hereby corrected as shown below:

In the heading insert:  --Assignee: The Alan I W Frank Corporation, Pittsburgh, Pennsylvania, a corporation of Pennsylvania--; under Related U.S. Application Data change "November 10, 1972" to --November 20, 1972--.

In the Abstract, lines 13 and 14, change "forming expanding and to --expanding and forming--; line 17, change "squre to --square--; line 24, change "mold" to --core--; line 41, change "core" to --mold--; line 42, change "mold" to --core--.

Column 1, line 6 change "November 10, 1972" to --November 20, 1972--.

Column 2, line 42, before "members" insert --mold--; line 65, change "stem" to --steam--.

Column 3, line 6, in the blank space after "from" insert --1/2"--; same line, after "2" insert --"--.

Column 4, line 26 (claim 2, line 2), change "suare" to --square--.

Signed and Sealed this

Sixth Day of July 1976

[SEAL]

Attest:

RUTH C. MASON
*Attesting Officer*

C. MARSHALL DANN
*Commissioner of Patents and Trademarks*